United States Patent [19]

Holzner et al.

[11] Patent Number: 5,682,593
[45] Date of Patent: Oct. 28, 1997

[54] EXTRACTION OF ACIDS AND METAL SALTS FROM AQUEOUS SOLUTIONS WITH DIETHYL DODECYLPHOSPHONATE

[75] Inventors: Christoph Holzner, Köln; Hans-Dieter Block; Hans-Heinrich Moretto, both of Leverkusen, all of Germany

[73] Assignee: Bayer Aktiengesellschaft, Leverkusen, Germany

[21] Appl. No.: 545,454

[22] Filed: Oct. 19, 1995

[30] Foreign Application Priority Data

Oct. 26, 1994 [DE] Germany ............... 44 38 174.3

[51] Int. Cl.[6] ................................. C01G 43/00
[52] U.S. Cl. ............... 423/10; 423/21.5; 423/22; 423/24; 423/49; 423/54; 423/63; 423/70; 423/89; 423/99; 423/112; 423/139; 423/658.5
[58] Field of Search .................. 423/10, 21.5, 22, 423/24, 49, 54, 63, 70, 89, 99, 112, 139, 658.5

[56] References Cited

U.S. PATENT DOCUMENTS

| | | | |
|---|---|---|---|
| 2,859,094 | 11/1958 | Schmitt et al. | 423/10 |
| 2,864,668 | 12/1958 | Baldwin et al. | 423/10 |
| 2,882,123 | 4/1959 | Long | 423/10 |
| 3,312,623 | 4/1967 | Fitch et al. | 252/106 |
| 3,493,639 | 2/1970 | Tavs | 260/969 |
| 3,751,555 | 8/1973 | Peterson . | |
| 4,012,480 | 3/1977 | Delvalle | 423/10 |
| 4,255,392 | 3/1981 | Chiang | 423/10 |
| 4,371,504 | 2/1983 | Leaders et al. | 423/10 |
| 4,461,748 | 7/1984 | Sabot et al. | 423/10 |
| 4,544,530 | 10/1985 | Tsai et al. | 423/10 |
| 4,587,107 | 5/1986 | Wisniak | 423/10 |
| 4,986,742 | 1/1991 | Denecker et al. . | |

OTHER PUBLICATIONS

Ritcey et al, *Process Metallurgy 1*, "Solvent Extraction", Principles and Applications to Process Metallurgy, Part I, pp. 210–217, Elsevier, New York (1984).

G.M. Ritcey et al., "Science and Technology of Tributyl Phosphate", vol. II (A), Ch. 3, pp. 65–121, CRC Press, Boca Raton, FL. (1987).

*Primary Examiner*—Edward A. Miller
*Attorney, Agent, or Firm*—Sprung Kramer Schaefer & Briscoe

[57] ABSTRACT

Use of diethyl dodecylphosphonate (DEDP) for the extraction of acids and metal salts from aqueous solutions.

11 Claims, No Drawings

EXTRACTION OF ACIDS AND METAL SALTS FROM AQUEOUS SOLUTIONS WITH DIETHYL DODECYLPHOSPHONATE

This invention relates to the use of diethyl dodecylphosphonate ($C_{12}H_{25}P(O)(OC_2H_5)_2$; DEDP) for the extraction of acids and metal salts from aqueous solutions.

Tributyl phosphate (TBP) is used in the art as an extractant for phosphoric acid, uranium, rare earths, zinc, iron and other metals (Science and Technology of Tributyl Phosphate; W. W. Schultz, J. D. Navratil; CRC Press, Boca Raton, Fla. (1987) Vol. II A, pages 65–121). Its extraction effect is based on the formation of lipophilic solvates with electrically neutral acid molecules or metal salts. Numerous metals such as zinc or iron form chloro complexes in hydrochloric acid solution, which are extracted with high $C_{organic}/C_{aqueous}$ distribution coefficients as $ZnCl_2.2TBP$ or $HFeCl_4.2TBP$ for example. Lanthanides or actinides form stable nitrato complexes in nitric acid solution, which are likewise extracted with high distribution coefficients. In cases such as these, satisfactory extraction results are obtained with tributyl phosphate.

With sulphate-containing solutions it behaves differently. As a rule, sulphate complexes are less stable than chloro or nitrato complexes, which is why almost all metals can only be extracted from sulphuric acid solution with low distribution coefficients when TBP is used. Low distribution coefficients are also observed for the extraction of most acids. The economics of such extraction processes are called into question by their low distribution coefficients and low extraction yields.

It has therefore been proposed in the patent literature that other extractants such as dibutyl butylphosphonate (DBBP) be used for species which are more difficult to extract, such as titanyl sulphate in sulphufic acid solution (DE-OS 3 643 711). Dibutyl butylphosphonate results in higher distribution coefficients than TBP, but has the disadvantage of a higher solubility in water. The solubility in water of pure TBP is 400 mg/l, whereas that of pure DBBP is 1200 mg/l. Dipentyl pentylphosphonate (DPPP) and dibutyl octylphosphonate (DBOP) are significantly better than DBBP as regards their solubilities in water of 100 mg/l and 10 mg/l, respectively, but they are significantly inferior to DBBP as regards their distribution coefficients, which are likewise low.

The object of the present invention is therefore to provide a suitable extractant for difficultly extractable species which in addition can be prepared in a simple manner and exhibits an extremely low solubility in water and high distribution coefficients. This object is achieved by the use of diethyl dodecylphosphonate as an extractant.

The present invention relates to the use of diethyl dodecylphosphonate (DEDP) as an extractant for acids and metal salts from aqueous solutions.

The isomerically pure reaction product of triethyl phosphite and 1-chlorodecane, or the reaction product of 1-dodecene and diethyl phosphite, which may contain other isomeric $C_{12}$ compounds in addition to diethyl n-dodecylphosphonate as the major component, can be used as DEDP.

DEDP may be used as the extractant either undiluted or diluted with a solvent from the group comprising aliphatic, alicyclic or aromatic hydrocarbons. A modifier, such as isodecanol or nonylphenol for example, may also be added if required to prevent the formation of a third phase.

DEDP may also preferably be used in admixture with other neutral, acidic or basic extractants. For example, a mixture of DEDP with the neutral extractant tributyl phosphate can be used for the extraction of phosphoric acid. A mixture of DEDP with the acidic extractant di-(2-ethylhexyl)phosphoric acid can be used for the extraction of molybdenum from mineral acid solutions, for example. DEDP can also be used as a modifier in extractions with long chain amines, for example.

The acids to be extracted may be both inorganic and organic acids.

The term "inorganic acids" comprises strong mineral acids, such as $HPO_4$, $H_2SO_4$, $HNO_3$ or $HCl$, for example, weak acids, such as $H_3BO_3$ or $H_2O_2$ for example, and also oxyacids of numerous metals, semimetals and nonmetals, such as $HReO_4$, $H_2SeO_4$ or $HClO_4$, for example. The latter acids are preferably formed from the elements of auxiliary groups 4 to 8 and main groups 5 to 7 of the periodic table of the elements, since these elements preferentially form acidic or amphoteric oxides or hydroxides in their higher oxidation states. The extraction of the last-mentioned acids proceeds with particularly high yields if a mineral acid, such as $H_2SO_4$ for example, is present in addition in the aqueous phase.

The term "organic acids" comprises mono- and polyfunctional carboxylic acids, hydroxycarboxylic acids, aminocarboxylic acids, sulphonic acids, phenols, thiols and alcohols.

The extractable metal salts comprise all salts of the metals and semimetals of the periodic table, with the exception of the salts of the alkali and alkaline earth metals.

The salts of metals and semimetals of main groups 3 to 6 of the periodic table, with the exception of aluminum salts, as well as the salts of metals of auxiliary groups 1 to 3 and auxiliary group 8 and of the actinides, are preferably extracted from chloride-containing solutions.

The salts of scandium, yttrium, lanthanum, the lanthanides and of the actinides are preferably extracted from nitrate-containing solutions.

The salts of metals of auxiliary group 2 and auxiliary groups 4 to 8 of the periodic table, provided that these metals are present in higher oxidation states, and the salts of metals and semimetals of main groups 4 to 6 of the periodic table, are preferably extracted from sulphuric acid or nitric acid solutions. In this connection, the term "higher oxidation states" means that the positive oxidation state of the metal is equal to the group number $G_M$ of the metal within the periodic table or is equal to the group number reduced by one: $G_{M-1}$, for example Ti(IV), V(V) or Cr(VI).

In this respect, the periodic table is constructed so that the groups have the following meanings:

| auxiliary group 1 | Cu, Ag, Au | $G_M = 1$ |
|---|---|---|
| auxiliary group 2 | Zn, Cd, Hg | $G_M = 2$ |
| auxiliary group 3 | Sc, Y, La, Ac | $G_M = 3$ |
| auxiliary group 4 | Ti, Zr, Hf | $G_M = 4$ |
| auxiliary group 5 | V, Nb, Ta | $G_M = 5$ |
| auxiliary group 6 | Cr, Mo, W | $G_M = 6$ |
| auxiliary group 7 | Mn, Te, Re | $G_M = 7$ |
| auxiliary group 8 | Fe, Ru, Os, Co, Rh, Ir, Ni, Pd, Pt | $G_M = 8$ |
| main group 1 | Li, Na, K, Rb, Cs, Fr | |
| main group 2 | Be, Mg, Ca, Sr, Ba, Ra | |
| main group 3 | B, Al, Ga, In, Tl | |
| main group 4 | C, Si, Ge, Sn, Pb | |
| main group 5 | N, P, As, Sb, Bi | |
| main group 6 | O, S, Se, Te, Po | |
| main group 7 | F, Cl, Br, I, At | |
| main group 8 | Ne, Ar, Kr, Xe, Rn | |

In all these applications DEDP has the advantage of an extremely low solubility in water compared with the extractants TBP, DBBP and DPPP which were mentioned at the outset. Although diethyl dodecylphosphonate (DEDP) only has one more carbon atom than dipentyl pentylphosphonate (DPPP), its solubility in water of 5 mg/l is lower by a factor of 20. Moreover dibutyl octylphosphonate (DBOP) has a solubility in water which is twice that of DEDP, despite having the same number of carbon atoms. A first natural assumption, namely that DEDP should be more sensitive to hydrolysis than DPPP or DBOP due to the presence of the two ethoxy groups in its molecule, is refuted by comparative measurements. The compounds DEDP, DPPP and DBOP exhibit no decomposition phenomena at 40° C. in 3 moles/l $H_2SO_4$, even after 6 weeks. Phase separation takes place considerably more rapidly and completely with DEDP than with DPPP or DBOP, however.

In summary in relation to comparable dialkyl alkylphosphonates such as DBBP, DPPP and DBOP, DEDP has a significantly lower solubility in water whilst maintaining a constant resistance to hydrolysis, and in addition exhibits better phase separation. The use of DEDP results in particularly low losses of extractant during the extraction process, which considerably improves the economics of the process. The aforementioned advantages relate to all extraction processes, irrespective of the type of species extracted.

Another advantage of the use of DEDP is manifested by the extraction of compounds of elements of auxiliary group 2 and auxiliary groups 4 to 8, provided that these are present in higher oxidation states, and by the extraction of compounds of metals and semimetals of main groups 4 to 6 of the periodic table.

These elements can normally only be extracted from sulphuric acid or nitric acid solution by commonly used extractants such as TBP or DBBP with very low distribution coefficients. Higher distribution coefficients are required, however, together with a lower acid concentration in the solution at the same time. DEDP exhibits higher distribution coefficients than DBBP for these applications also, which is extremely surprising, since DEDP has a molecular weight which is considerably higher than that of DBBP and lower distribution coefficients compared with DBBP would accordingly be expected. DBOP behaves completely as expected, however. With the same molecular weight as DEDP, it exhibits significantly lower distribution coefficients than DBBP. In this respect the contrasting behavior of DBOP and DEDP is surprising, since both compounds have unsymmetrical alkyl substitution and the same molecular weight and the same number of carbon atoms. Example 1 and Table 1 hereinbelow clarify this by way of an example illustrating the extraction of titanium(IV) from sulphuric acid solution. It follows from Table 1 that higher distribution coefficients are observed for DEDP than for DBBP and DBOP, particularly at low sulphuric acid concentrations. This is therefore particularly advantageous, because the solubility of titanyl sulphate in sulphuric acid falls off considerably at high $H_2SO_4$ concentrations, due to which the higher range of concentration for a titanium extraction is only used in exceptional cases.

Higher distribution coefficients than for DBBP and DBOP are also observed for phosphoric acid or hydrochloric acid extraction (see Tables 2 and 3 hereinbelow).

The metal salts and acids are stripped in the known manner by contacting the organic phase with water or with a basic aqueous solution containing NaOH, $NaHCO_3$, $K_3PO_4$, $NH_3$ or other basic substances, for example. Stripping may also be effected at a temperature which is higher than that used for the extraction.

In many cases extraction with DEDP can be effected selectively with respect to a given species, so that numerous separations are possible.

For example, the following substances can be extracted from sulphuric acid or nitric acid solution using DEDP:

acids and metal salts of main groups 4 to 7 of the periodic table, with the exception of lead and of boron;

acids and metals of auxiliary group 2 and auxiliary groups 4 to 8 of the periodic table, provided that the oxidation state of the metal is equal to the group number $G_M$ of the metal or is equal to the group number reduced by one: $G_{M-1}$ (higher oxidation state).

In contrast, examples of substances which cannot be extracted from sulphuric acid or nitric acid solution comprise:

acids and salts of metals of auxiliary group 2 and auxiliary groups 4 to 8 of the periodic table, provided that the oxidation state of the metal is lower than the group number reduced by one: $G_{M-1}$ (lower oxidation state);

acids and salts of metals of main groups 1 to 3 other than boron and auxiliary group 1 of the periodic table.

From this it follows that acids and metal salts of main groups 4 to 7 of the periodic table and of boron, with the exception of lead, as well as metals of auxiliary group 2 and auxiliary groups 4 to 8 of the periodic table in their higher oxidation states, can be separated, by selective extraction from sulphuric acid or nitric acid solution, from non-extractable species of metals of auxiliary group 2 and auxiliary groups 4 to 8 in their lower oxidation states, and from metals of main groups 1 to 3 other than boron and metals of auxiliary group 1 of the periodic table.

Examples of possible applications include:

selective extraction of titanium(IV) from sulphuric acid leaching or precipitation solutions from $TiO_2$ production [Ti(IV) (auxiliary group 4, higher oxidation state $G_M$) is selectively extracted in the presence of Al(III) (main group 3), Mg(II) (main group 2), Fe(II) (auxiliary group 8, lower oxidation state $G_{M-6}$), Cr(III) (auxiliary group 6, lower oxidation state $G_{M-3}$) and V(III) (auxiliary group 5, lower oxidation state $G_{M-2}$)].

selective extraction of phosphoric acid from sulphuric acid leaching solutions of phosphate-containing minerals [$H_3PO_4$ (acid, main group 5) is selectively extracted in the presence of Al(III) (main group 3) and Fe(III) (auxiliary group 8, lower oxidation state $G_{M-5}$)].

The invention will be explained in more detail by means of the following examples.

EXAMPLES

Example 1

Extraction of Ti(IV) from sulphuric acid solution with DEDP (compared with DBBP and DBOP)

Several solutions of titanyl sulphate in aqueous sulphuric acid having initial contents of 50 to 70 kg titanium/kg solution and 1 to 5 moles of sulphuric acid/l of solution were intensively stirred with undiluted DEDP, DBBP or DBOP for 15 minutes at room temperature (phase ratio about 1/1). After phase separation, the titanium content of the aqueous phases (raffinates) was determined directly, and that of the organic phases was determined after digestion with $H_2SO_4$/$H_2O_2$, by means of atomic absorption spectroscopy. In order to determine the acid content the aqueous phases were first diluted with water in a ratio of 1/100 and heated for one hour under reflux. Thereafter the total acid content was determined by titration with sodium hydroxide. The results are listed in Table 1.

TABLE 1

Results of titanium extraction from sulphuric acid solution with DEDP, DBBP and DBOP

| Extractant | Total acid content of raffinate (calculated as moles $HSO_4$/l) | Titanium content of raffinate (g/kg) | Titanium distribution coefficient $C_{organic}/C_{aqueous}$ |
|---|---|---|---|
| DEDP | 2.31 | 46 | 0.16 |
| DEDP | 3.41 | 37 | 0.32 |
| DEDP | 4.31 | 31 | 0.47 |
| DEDP | 4.96 | 24 | 0.74 |
| DEDP | 5.60 | 17 | 1.2 |
| DBBP | 2.48 | 65 | 0.009 |
| DBBP | 3.51 | 59 | 0.059 |
| DBBP | 4.53 | 50 | 0.23 |
| DBBP | 4.97 | 43 | 0.41 |
| DBBP | 5.35 | 36 | 0.69 |
| DBOP | 3.49 | 39 | 0.04 |
| DBOP | 4.45 | 33 | 0.15 |
| DBOP | 5.20 | 28 | 0.45 |

Example 2

Extraction of phosphoric acid with DEDP (compared with TBP)

The undiluted extractants, which were previously loaded with water, were intensively stirred with aqueous phosphoric acid solutions, the initial content of which was 1 to 50% $H_3PO_4$, for 15 minutes at room temperature. After phase separation the acid concentrations of the aqueous and organic phases were determined by titration with KOH. The results are given in Table 2.

TABLE 2

Results of phosphoric acid extraction with DEDP and TBP

| Extractant | Acid concentration in aqueous phase (moles $HPO_4$/l) | $H_3PO_4$ distribution coefficient $C_{organic}/C_{aqueous}$ |
|---|---|---|
| DEDP | 0.393 | 0.38 |
| DEDP | 0.798 | 0.38 |
| DEDP | 1.22 | 0.39 |
| DEDP | 2.70 | 0.37 |
| TBP | 0.480 | 0.10 |
| TBP | 0.766 | 0.12 |
| TBP | 1.453 | 0.17 |
| TBP | 2.993 | 0.24 |

Example 3

Extraction of hydrochloric acid with DEDP (compared with DBBP and DBOP)

The procedure was analogous to that of Example 2 except that the phosphoric acid was replaced by hydrochloric acid. The results are given in Table 3.

TABLE 3

Results of hydrochloric acid extraction with DEDP, DBBP and DBOP

| Extractant | Acid concentration in aqueous phase (moles $HPO_4$/l) | HCl distribution coefficient $C_{organic}/C_{aqueous}$ |
|---|---|---|
| DEDP | 0.461 | 0.238 |
| DEDP | 1.80 | 0.37 |
| DEDP | 3.43 | 0.41 |
| DBBP | 0.501 | 0.10 |
| DBBP | 1.49 | 0.19 |
| DBBP | 3.22 | 0.34 |
| DBOP | 0.54 | 0.06 |
| DBOP | 1.59 | 0.13 |
| DBOP | 3.47 | 0.25 |

It will be understood that the specification and examples are illustrative but not limitative of the present invention and that other embodiments within the spirit and scope of the invention will suggest themselves to those skilled in the art.

We claim:

1. A method for the extraction of at least one acid or metal salt from an aqueous solution thereof which comprises mixing said solution with diethyl dodecylphosphonate, allowing the mixture to stratify into layers, and separating the layers.

2. The method according to claim 1, wherein the diethyl dodecylphosphonate is employed in combination with an aliphatic, alicyclic or aromatic hydrocarbon.

3. The method according to claim 1, wherein the mixing is effected in the presence of a modifier.

4. The method according to claim 3, wherein the modifier comprises at least one of isodecanol or nonylphenol.

5. The method according to claim 1, wherein the diethyl dodecylphosphonate is employed in combination with an acidic, neutral or basic additional extractant for the acid or metal salt.

6. The method according to claim 1, wherein the aqueous solution contains an acid.

7. The method according to claim 1, wherein the acid or metal salt is present as a solution in sulfuric or nitric acid and is selected from the group consisting of an extractable acid or a metal salt of main groups 4 to 7 of the periodic table and boron, with the exception of lead, or of auxiliary group 2 and auxiliary group 4 to 8 of the periodic table, the oxidation states of which correspond to the group number $G_M$ of the auxiliary group metal or to the group number reduced by one: $G_{M-1}$.

8. The method according to claim 1, wherein the aqueous solution comprises titanyl sulphate in aqueous sulfuric acid.

9. The method according to claim 7, wherein the aqueous solution additionally contains at least one non-extractable salt of a metal selected from the group consisting of a metal of auxiliary group 2 and auxiliary groups 4 to 8 of the periodic table, the oxidation state of which is lower than $G_{M-1}$, and a metal of main groups 1 to 3 and auxiliary group 1 of the periodic table and wherein these additional metal salts are not extracted.

10. The method according to claim 1, wherein the acid or metal salt is present as a solution in phosphoric or nitric acid or in a nitrate solution and is selected from the group consisting of scandium, yttrium, lanthanum, a lanthanide and actinide.

11. The method according to claim 1, wherein the acid or metal salt is present as a solution in hydrochloric acid or in a chloride solution and is selected from the group consisting of a metal of main groups 3 to 7 of the periodic table with the exception of aluminum, auxiliary groups 1 to 3 and auxiliary group 8 of the periodic table, and of an actinide.

* * * * *